(12) United States Patent
Balogh et al.

(10) Patent No.: US 10,599,657 B1
(45) Date of Patent: Mar. 24, 2020

(54) METHODS, SYSTEMS AND COMPUTER READABLE MEDIA FOR PROVIDING FOR SEARCHING OF TEST OBJECTS APPLICATION PROGRAMMING INTERFACE (API) SPECIFICATION AND CURRENT TEST CONFIGURATION DATA

(71) Applicant: Keysight Technologies, Inc., Minneapolis, MN (US)

(72) Inventors: Andrey John Balogh, Bothell, WA (US); Razvan Ionut Stan, Agoura Hills, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/886,809

(22) Filed: Feb. 1, 2018

(51) Int. Cl.
*G06F 16/2457* (2019.01)
*H04L 12/24* (2006.01)
*G06F 9/448* (2018.01)
*G06F 16/2458* (2019.01)

(52) U.S. Cl.
CPC .......... *G06F 16/2457* (2019.01); *G06F 9/448* (2018.02); *G06F 16/2458* (2019.01); *H04L 41/08* (2013.01)

(58) Field of Classification Search
CPC .. G06F 9/448; G06F 16/2457; G06F 16/2458; H04L 41/08
See application file for complete search history.

(56) References Cited

U.S. PATENT DOCUMENTS

| | | |
|---|---|---|
| 6,321,347 B1 * | 11/2001 | Beeker .................... H04L 41/22 370/251 |
| 7,043,488 B1 | 5/2006 | Baer et al. |
| 7,340,481 B1 | 3/2008 | Baer et al. |
| 7,349,913 B2 | 3/2008 | Clark et al. |
| 7,428,528 B1 | 9/2008 | Ferrari et al. |
| 7,743,074 B1 | 6/2010 | Parupudi et al. |
| 8,234,282 B2 * | 7/2012 | Retzlaff, II ............ G06Q 30/00 707/741 |
| 9,729,398 B1 * | 8/2017 | Watson ..................... G06F 8/60 |
| 2002/0156767 A1 | 10/2002 | Costa et al. |
| 2011/0099159 A1 * | 4/2011 | Trevor .................. G06F 16/958 707/709 |

(Continued)

OTHER PUBLICATIONS

"IXNetwork Overview—L2/3 Network Infrastructure Performance Testing," www.ixiacom.com, 915-1801-01-6071 Rev Z, pp. 1-15 (Aug. 8, 2017).

*Primary Examiner* — Charles E Anya (57) ABSTRACT

A method for providing for searching a test objects API specification and defined object instances includes providing a test objects API browser for invoking a search engine to search a test objects API specification and current test configuration data of a network equipment test device. The method further includes receiving, via the test objects API browser search criteria for searching the hierarchical test objects API specification and the current test configuration data. The method further includes searching plural levels of the hierarchical test objects API specification and the current test configuration data using the search criteria. The method further includes outputting, to a user, the indication of test object definitions and defined instances of the test objects that match the search criteria.

15 Claims, 11 Drawing Sheets

(56) References Cited

U.S. PATENT DOCUMENTS

| | | | |
|---|---|---|---|
| 2013/0096866 A1* | 4/2013 | Kemmerling | G06F 8/30 |
| | | | 702/119 |
| 2014/0244204 A1* | 8/2014 | Frediani | G01R 31/31907 |
| | | | 702/119 |
| 2018/0338187 A1* | 11/2018 | Ketonen | H04N 21/64738 |

* cited by examiner

METHODS, SYSTEMS AND COMPUTER READABLE MEDIA FOR PROVIDING FOR SEARCHING OF TEST OBJECTS APPLICATION PROGRAMMING INTERFACE (API) SPECIFICATION AND CURRENT TEST CONFIGURATION DATA

TECHNICAL FIELD

The subject matter described herein relates to facilitating access to an application programming interface used to access functionality of a network equipment test device. More particularly, the subject matter described herein relates to providing for searching of a hierarchical test object API specification and current test configuration data of a network equipment test device.

BACKGROUND

Network equipment test devices, such as the IxNetwork® test device available from Keysight Technologies, Inc., generate test traffic to test the functionality and performance of network devices under test. The user of a network equipment test device specifies test parameters in advance of executing a test. To allow users to specify test parameters, a network equipment test device includes an application programming interface (API) that defines objects that are used to access test device functions. Examples of test device functions that may be accessed through objects include starting network protocols, such as border gateway protocol (BGP), transmission control protocol (TCP), etc., establishing connections with devices under test, and displaying network performance statistics. To find an object needed for a test, a user searches through documentation or a specification for the test device API and defines instances of objects to execute a given test. The instances of the objects are stored as current test configuration data for a given test configuration.

One problem with APIs used to configure tests for testing network devices is that users may not know where the definition for a given object is located in the API documentation or specification. In some instances, the API documentation or specification may be arranged in a hierarchical manner with multiple levels. The user may not know in which level a desired object definition is located and must manually search through the multiple levels to find the object definitions for which the user wishes to define instances for a given test.

Another related problem occurs when multiple users work on a given test. One user may start defining object instances for a test and store those object instances in a current test configuration datastore associated with a network equipment test device. Another user working on the same test may need to access the object instances defined by the first user. However, the second user may not know where in the current test configuration datastore the first user stored the object instances. Accordingly, the second user is required to manually search through the object instances to locate the instances defined by the first user. The problem is magnified further when more than two users work on a given test.

In light of these difficulties, there exists a need for improved methods, systems, and computer readable media for providing for searching of a hierarchical network equipment test device API specification and current test configuration data.

SUMMARY

The subject matter described herein relates to methods, systems, and computer readable media for providing for searching of a hierarchical network equipment test device test objects API specification and current test configuration data. One method includes providing a test objects API browser for invoking a search engine to search a test objects API specification and current test configuration data of a network equipment test device. The method further includes receiving, via the test objects API browser, search criteria for searching the hierarchical test objects API specification and the current test configuration data. The method further includes searching plural levels of the hierarchical test objects API specification and the current test configuration data using the search criteria. The method further includes outputting, to a user, the indication of test object definitions and defined instances of the test objects that match the search criteria.

A system for providing for searching a hierarchical network equipment test device test objects application programming interface (API) and current test configuration data includes at least one processor. The system further includes a test objects API browser implemented by the at least one processor for providing a user interface for searching a hierarchical test objects API specification and current test configuration data of a network equipment test device, the hierarchical test objects API specification including a plurality of levels, at least some of which store definitions for test objects for accessing network equipment test device functions and the current test configuration data including defined instances of the test objects for invoking the network equipment test device functions. The system further includes a test objects API search engine implemented by the at least one processor for receiving, via the test objects API browser, search criteria for searching the hierarchical test objects API specification and the current test configuration data, searching, using the search engine, the plural levels of the hierarchical test objects API specification and the current test configuration data for objects and defined instances of test objects of the objects that match the search criteria; and outputting, to a user, the test object definitions and the defined instances of the test objects that match the search criteria.

The subject matter described herein for searching a hierarchical network equipment test device test objects API and current test configuration data may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, wherein like reference numerals represent like parts, of which.

DETAILED DESCRIPTION

Figure 1:
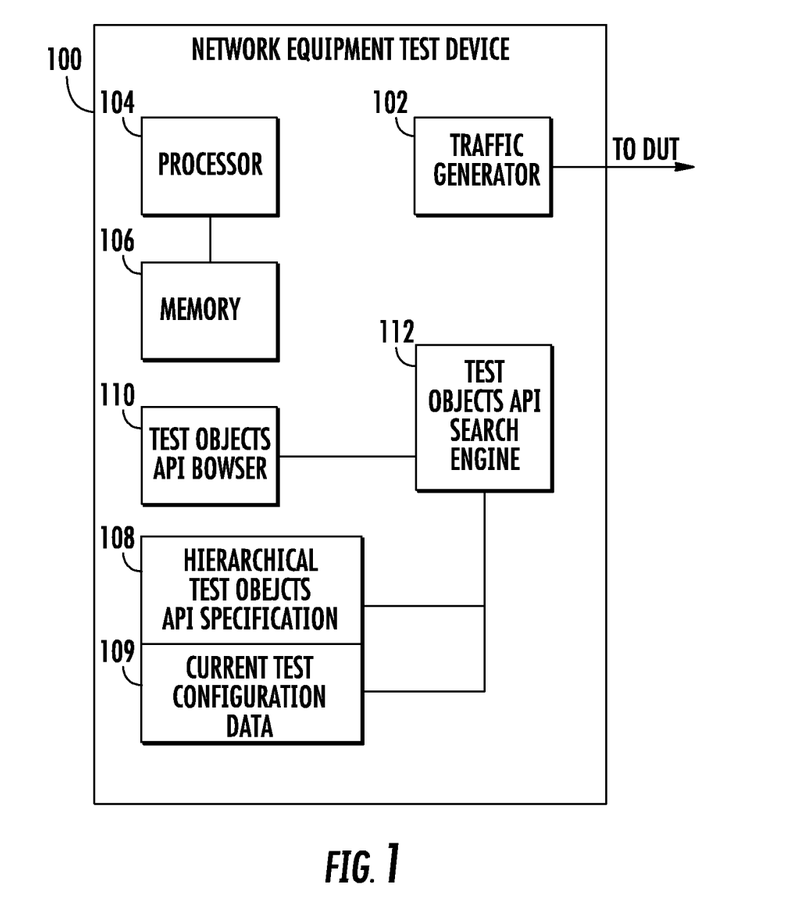
FIG. 1 is a block diagram of a network equipment test device including a test objects API browser and a test objects API search engine.

The subject matter described herein includes methods, systems, and computer readable media for providing for searching a hierarchical network equipment test device test objects API specification and current test configuration data. FIG. 1 is a block diagram of a network equipment test device for searching a test objects API specification and current test configuration data. Referring to FIG. 1, network equipment test device 100 may be a network device that generates test traffic, i.e., packet test traffic, and sends the traffic to a device under test. To this end, network equipment test device 100 may include a traffic generator 102, one or more processors 104, and memory 106. In one example, network equipment test device 100 may be the above-referenced IxNetwork® network test device or a device with similar functionality.

In operation, network equipment test device 100 may establish connections with or through one or more devices under test. Traffic generator 102 may then send test traffic to the device under test over the established connections. The type of test traffic transmitted to the device under test depends on the type of test being executed. For example, it may be desirable to test the device under test with regard to network protocol compliance, such as BGP protocol compliance. In such an example, traffic generator 102 may establish TCP connections with the device under test and send BGP network layer reachability update messages to the device under test over the connections.

In another example, it may be desirable to test the functionality of a device under stress conditions. In such an example, traffic generator may generate traffic at line rates and send the traffic to device under test to test the functionality of the device under test under heavy traffic loads.

In order to provide for user configuration of tests used to test a device under test, network equipment test device 100 may include a hierarchical test objects API specification 108 that stores test object definitions for objects used to implement tests. Hierarchical test objects API specification 108 may include a plurality of levels, which makes manually searching test objects API specification difficult. Examples of test object definitions that may be stored in hierarchical test objects API specification 108 include definitions of objects for establishing connections, running protocols over the connections, stress testing a device under test over connections, etc.

Network equipment test device 100 may also include current test configuration data 109 including defined instances of test objects. Current test configuration data 109 includes instances of objects defined by users that are configuring tests of one or more network devices. Because multiple users may work on a given test project, it is desirable to have a way to efficiently search both hierarchical test objects API specification 108 and current test configuration data 109.

In order to facilitate searching of hierarchical test objects API specification 108 and current test configuration data 109, a test objects API browser 110 and a test objects API search engine 112 may be provided. Test objects API browser 110 may allow a user to specify search criteria to be input to search engine 112. Test objects API search engine 112 receives the search criteria specified by the user and searches hierarchical test objects API specification 108 for object definitions and also searches current test configuration data 109 for defined object instances matching the search criteria specified by the user. The user is not required to specify the level in which the object definition or the object instance resides. Test objects API search engine 112 automatically searches plural levels in the hierarchy for object definitions and also searches current test configuration data for object instances matching the search criteria without requiring the user have knowledge of the structure of hierarchical test objects API 108. In addition, the user is not required to know the location in current test configuration data 109 where other users store object instances. Other users may dynamically populate current test configuration data 109 with object instances. When a user needs to search for object instances, the user simply inputs search criteria in to test objects API browser 110, which automatically searches current test configuration data 109 for any object instances that match the search criteria.

In the example illustrated in FIG. 1, network equipment test device 100 is a physical component. In an alternate implementation, network equipment test device or any one or more of its components may be virtual components. For example, network equipment test device 100 may be a virtual network component for deployment in a cloud network included hardware resources, such as one or more processors and memory, on which network equipment test device 100 can be implemented.

Figure 2A:
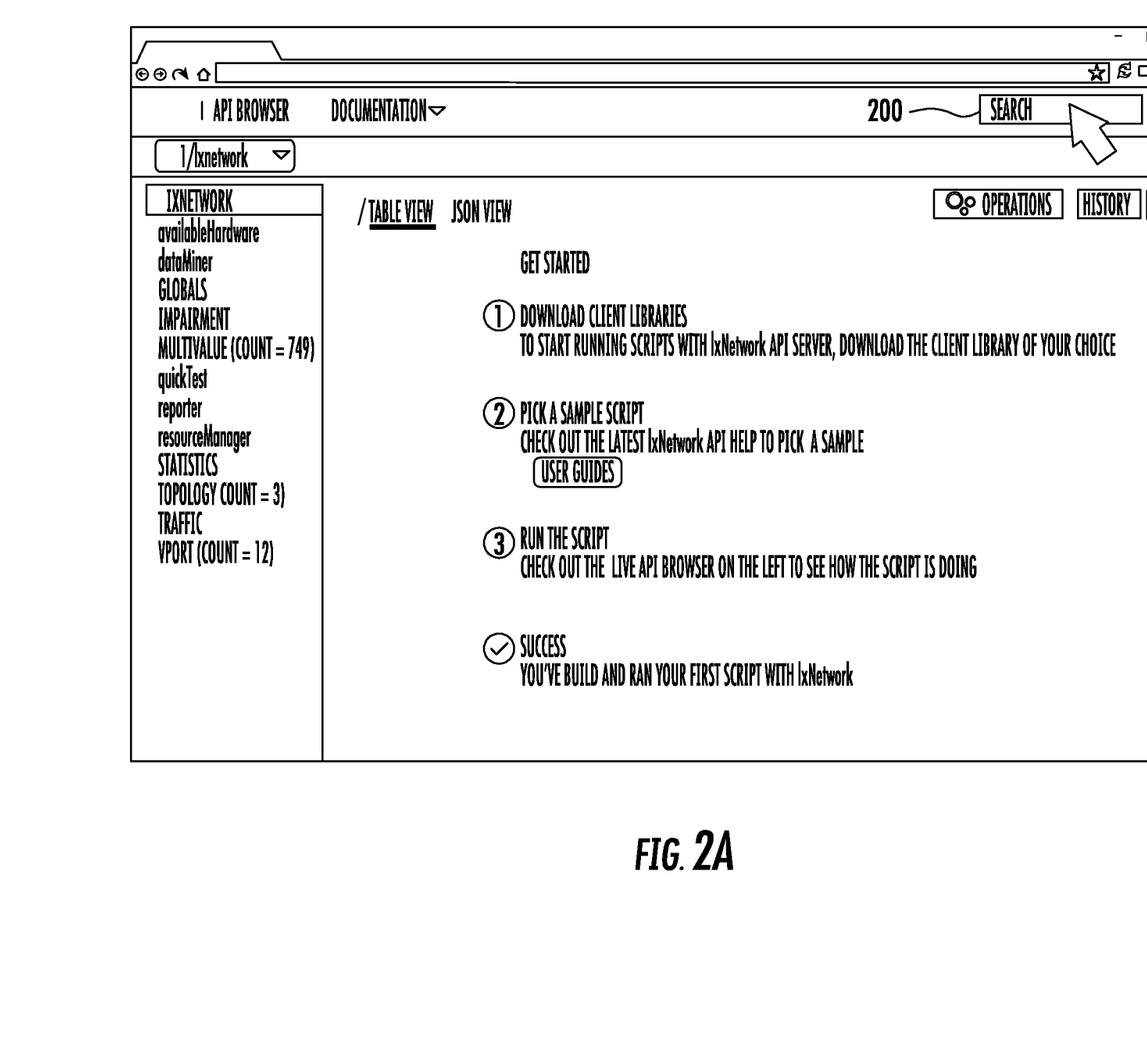
FIGS. 2A-2I are examples of interfaces presented by a test objects API browser for providing for searching of a hierarchical test objects API specification and current test configuration data using the test objects API search engine illustrated in FIG. 1.

FIGS. 2A-2I illustrate examples of interfaces provided by test objects API browser 110. Referring to FIG. 2A, one screen that may be provided by test objects API browser 110 may include a search dialog box 200 that allows the user to input search criteria for searching test objects API specification and current test configuration data. The user may input search criteria into dialog box 200 by typing text relating to a feature that the user desires to invoke during a test.

Figure 2B:
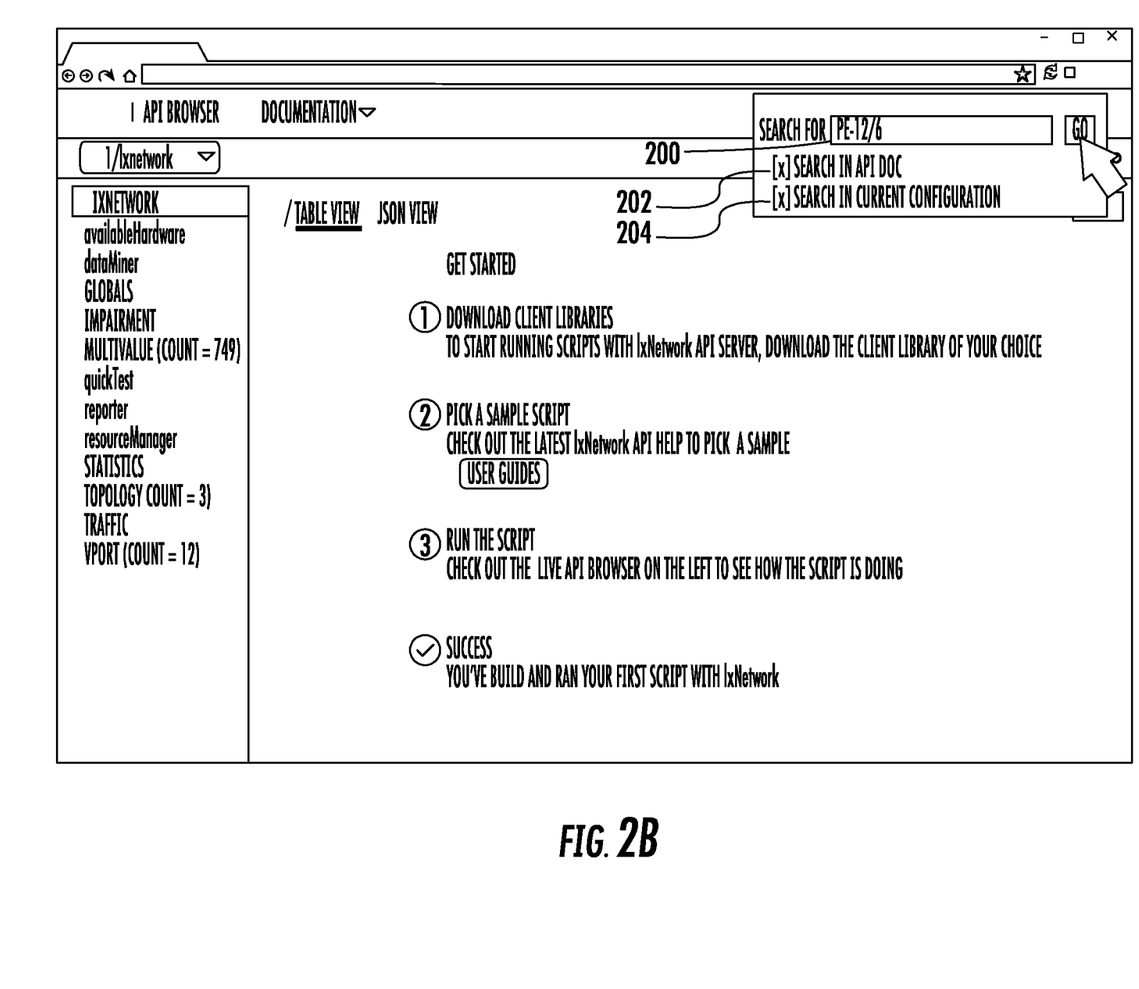

Referring to FIG. 2B, the user has input search criteria "PE-12/6" into dialog box 200. "PE-12/6" is the name that a customer may give to a virtual port in a test configuration. In this example, "PE" is an abbreviation for "provider edge". "12/6" refers to cart 12, virtual port number 6. Once the user inputs data into dialog box 200, test objects API browser 110 may provide check boxes 202 and 204 which allow the user to selectively search in hierarchical test objects API specification 108, current test configuration data 109, or both. In the illustrated example, the user is searching in both hierarchical test objects API specification 108 and in current test configuration data 109.

Figure 2C:
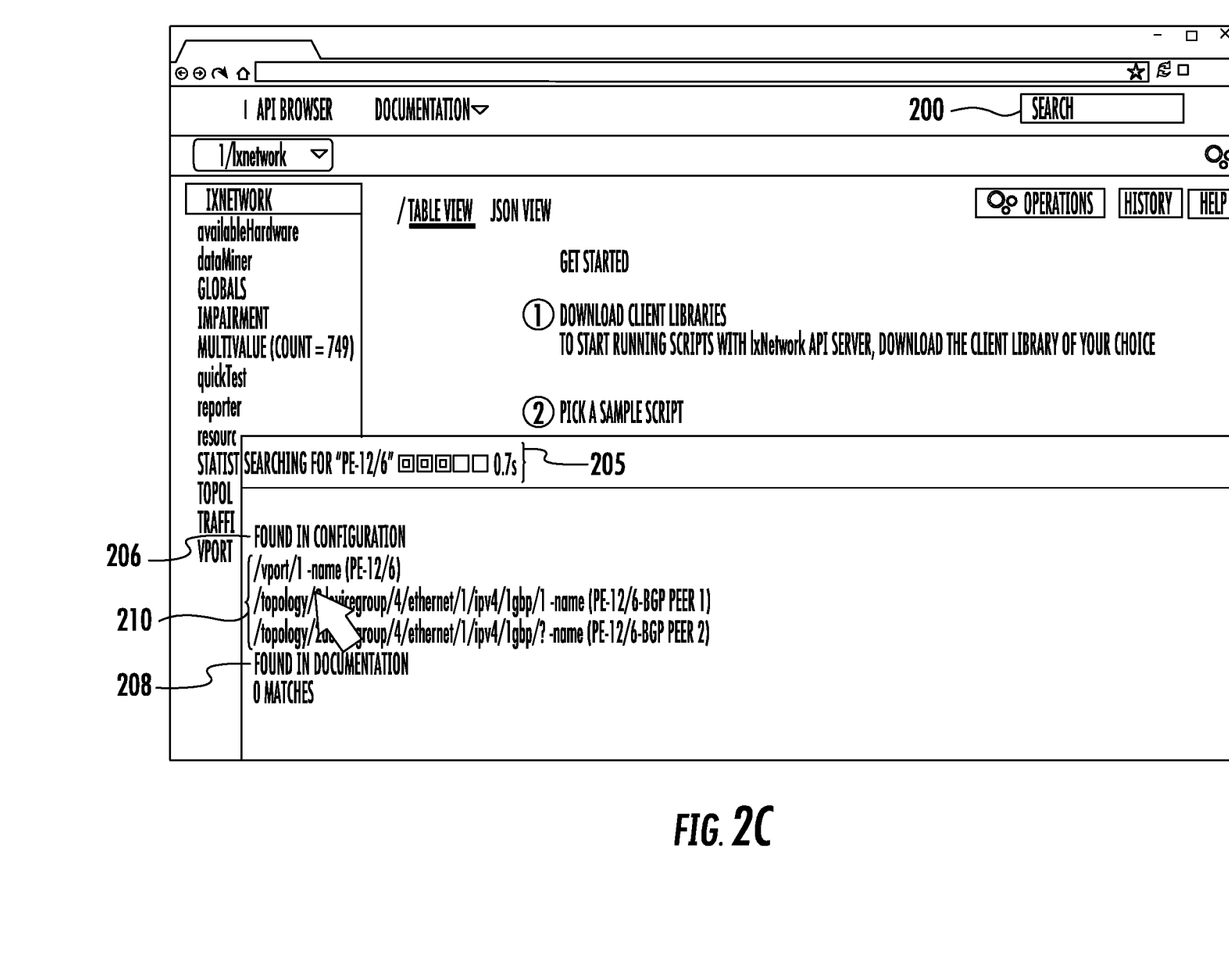

Once the user selects "go" in FIG. 2B, test objects API search engine 112 is invoked to search hierarchical test objects API specification 108 and current test configuration data 109. FIG. 2C illustrates initial results of the search illustrated in FIG. 2B. In one exemplary implementation, test objects API search engine 112 may return search results incrementally, rather than waiting until the entire search is complete before returning results. Returning search results incrementally includes displaying indicators of object definitions and object instances that match the search criteria in real time as the object definitions and object instances are located. API browser 110 may include a search progress indicator 205 that displays the search criteria, a visual indication of the progress of the search, and the time since the search was started. In the illustrated example, the search criteria is "PE-12/6", the status indicator is a sequence of boxes that are filled in from left to right in proportion to search progress, and the time since the search began is displayed in increments of one tenth of one second.

In FIG. 2C, test objects API browser 110 displays headings 206 and 208 that indicate whether results are found in current test configuration data 109, hierarchical test objects API specification 108, or both. In the illustrated example, results are only found in current test configuration data 109. The search results include selectable indicators 210 corresponding to the search criteria. Each selectable indicator 210 is a link for accessing a location in current test configuration data 109 where the indicated defined object instance can be found. Indicators 210, when selected, result in display of the corresponding defined object instance. When a user selects one of indicators 210 prior to a search being complete, test objects API browser 110 instructs search engine 112 to terminate the current search. Allowing users to terminate a search prior to completion can decrease the time required to implement a test over implementations where an entire search must be completed before search results can be accessed.

Figure 2D:
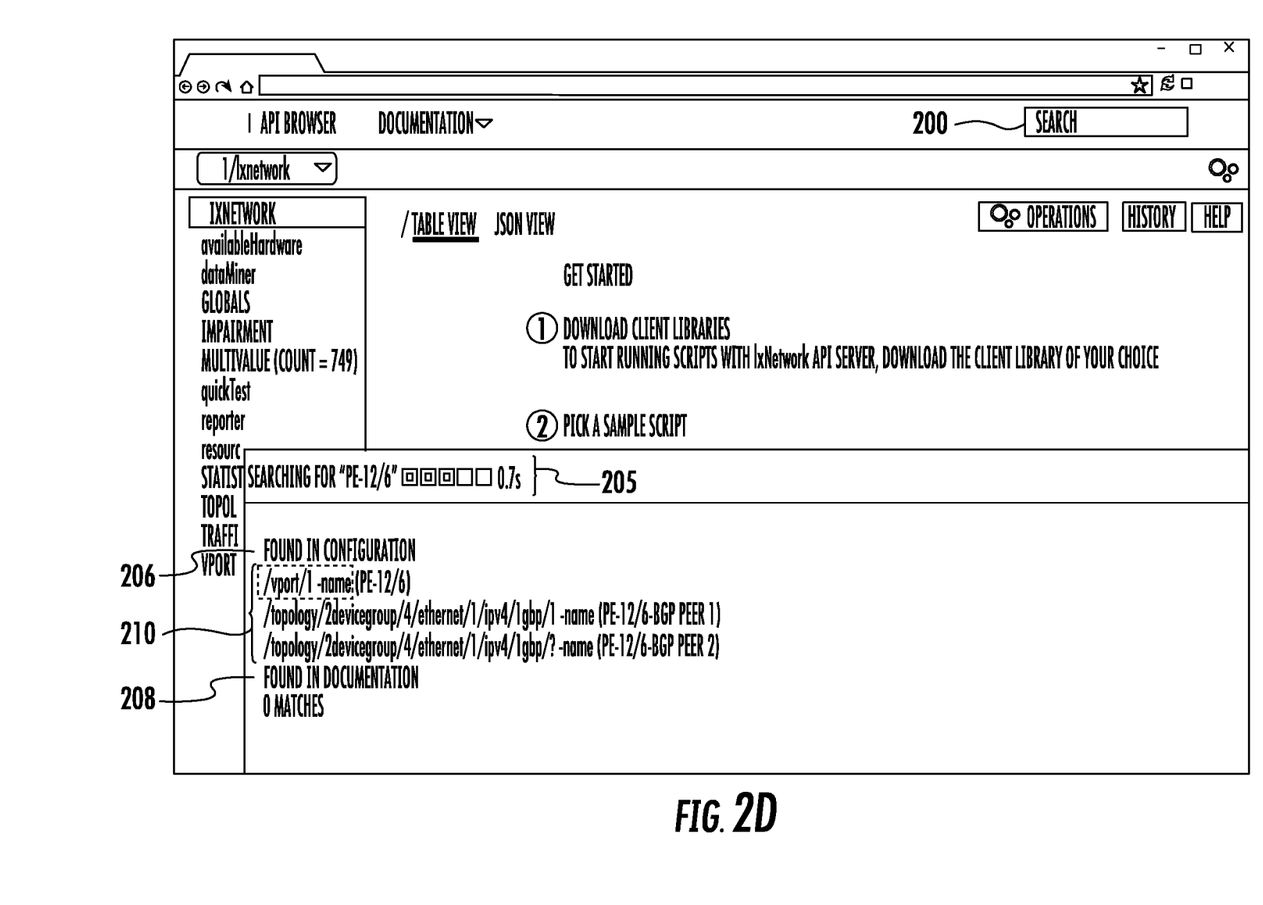
Figure 2E:
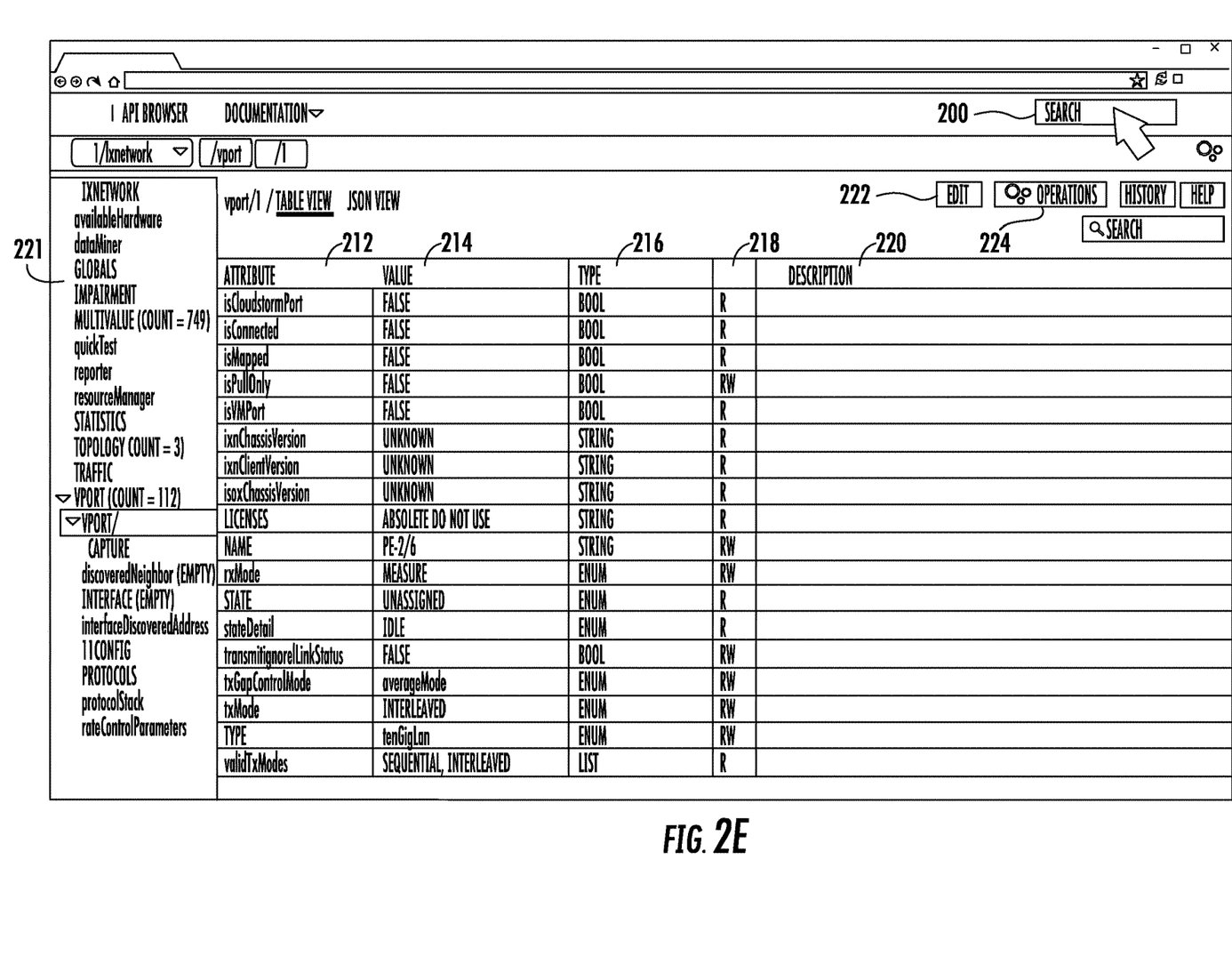

FIG. 2D illustrates selection of one of the selectable indicators Illustrated in FIG. 2C. In FIG. 2D, the user selects "/vport/1-name". FIG. 2E illustrates display of the corresponding defined object instance. The defined object instance includes a first column 212 that lists object attributes. A second column 214 lists values of the attributes. In the illustrated example, the name attribute has the value "PE-12/6", which matches the search criteria. A third column 216 lists the type of each attribute. A fourth column 218 lists whether each attributes is readable, readable and writable, or both. A sixth column 220 lists an optional description for each attribute that can be input by the user that created the object instance.

Test objects API browser 110 also displays a location section 221 that displays locations in current test configuration data 109 in which test object instances matching the search criteria are located. In the illustrated example, the virtual port object instance matching the search criterial is located in a storage location labeled "VPORT". Location section 221 displays, for each storage location, a count of defined object instances stored in each storage location. In the illustrated example, the count of virtual ports stored in the VPORT location is 112.

In one example, test objects API browser 110, using the series of steps illustrated in FIGS. 2B-2E can allow a user to search for a defined object instance by name and modify one or more attributes of the object. For example, the user may not know anything about the attributes for a virtual port but may need to change the virtual port for a test from copper to fiber. All the user is required to do is input the name of the virtual port that the user previously defined or was told by another user into search dialog box 200. The user then selects the link corresponding to the virtual port that matches the search criteria and reaches the screen illustrated in FIG. 2E which allows the user to edit individual attributes of the virtual port. To edit an attribute, test objects API browser 110 includes an edit button 222 that allows the user to edit attributes that are writable. To edit an attribute, the user selects a row in the table Illustrated in FIG. 2E, selects edit button 222, and then changes the value of the attribute. An operations button 224 allows the user to access a set of operations for the user to execute against a currently selected object instance. Examples of such operations include start, stop, pause, clear, restart.

Figure 2F:
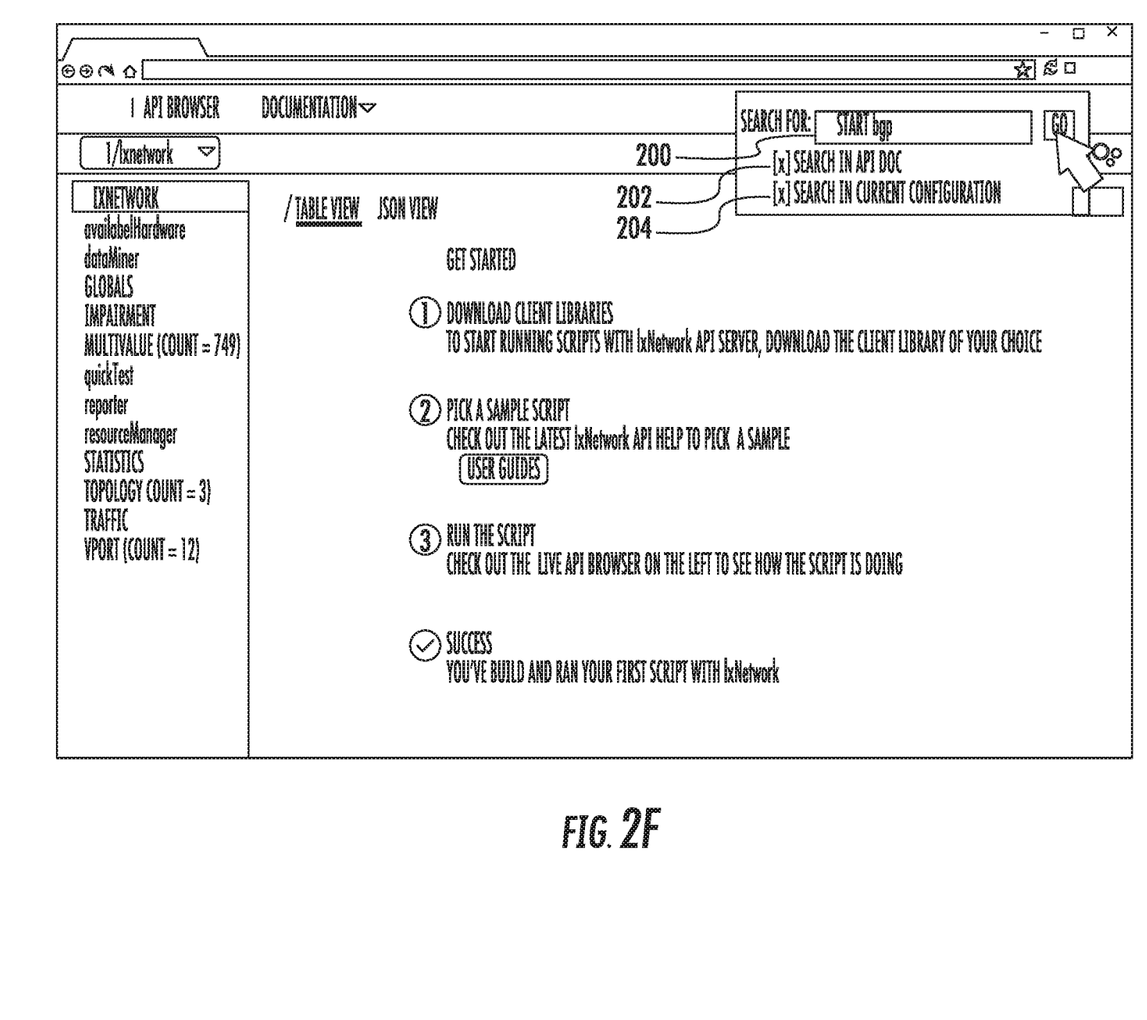

FIG. 2F illustrates another example of searching hierarchical test objects API specification 108 and current test configuration data 109 using test objects API browser 110. In FIG. 2F, the user specifies search criteria "start BGP" in search dialog box 200 and selects the search in both of hierarchical test objects API specification 108 and current test configuration data 109. In this example, the user may know that the user wants to start the BGP in a given test but does not know where the documentation exists in the hierarchy or whether there are any defined object instances for starting the BGP. Accordingly, the user simply types "start BGP" as the search criteria and selects go.

Figure 2G:
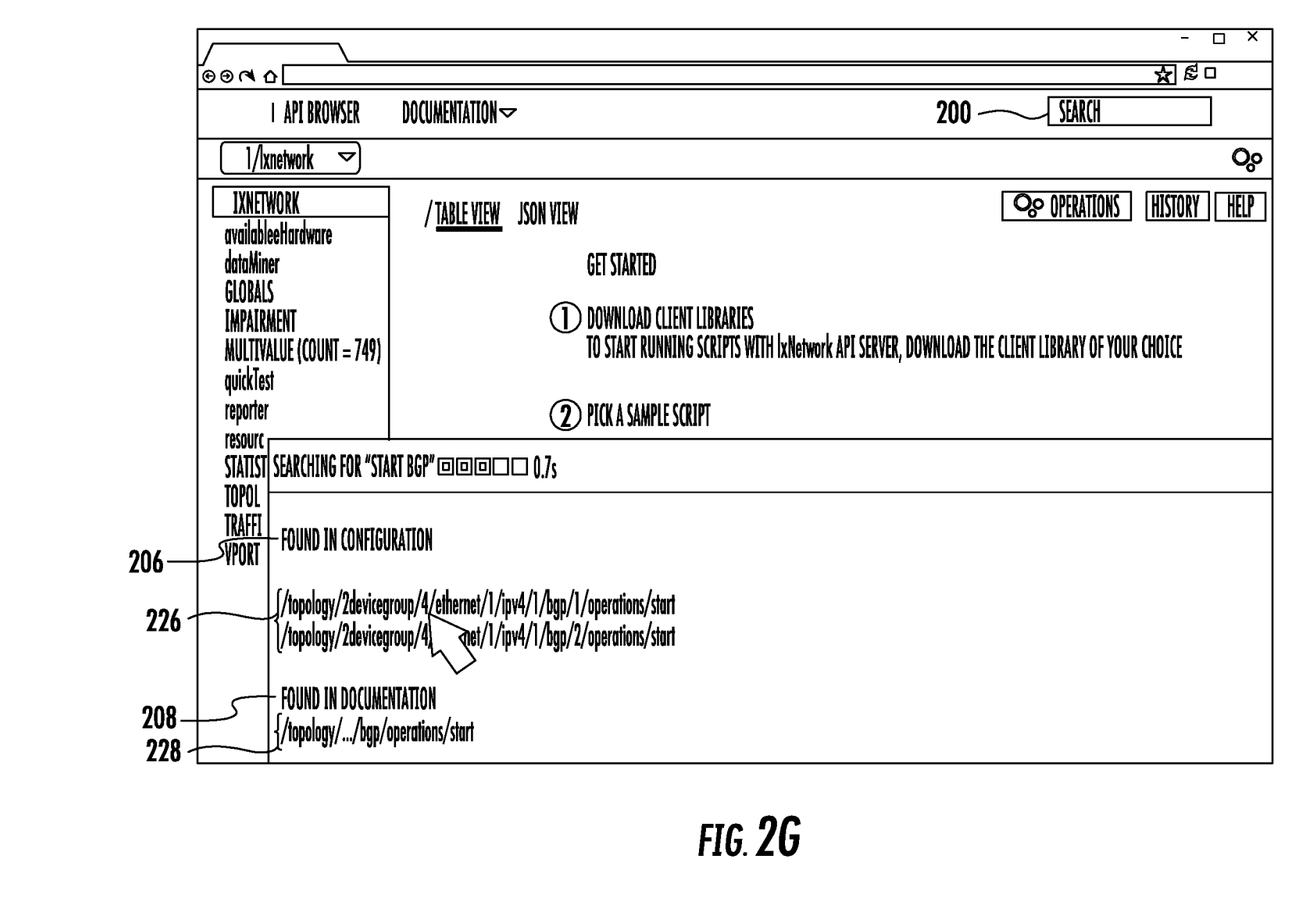

When the user selects "go" in FIG. 2F, the search results illustrated in FIG. 2G are displayed. In FIG. 2G, search results are located in both hierarchical test objects API specification 108 and in test configuration data 109, respectively indicated by selectable links 226 and 228.

Figure 2H:
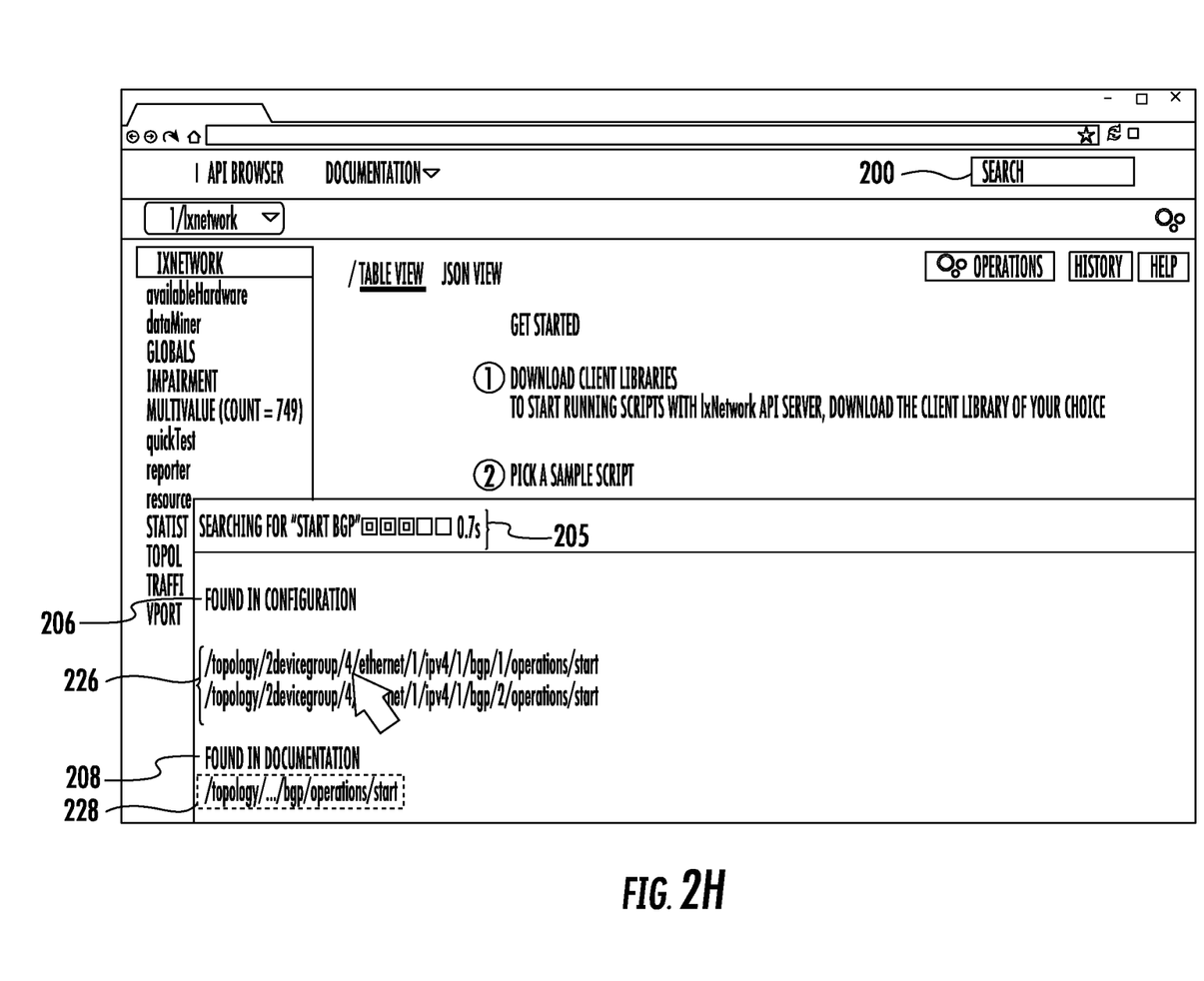
Figure 2I:
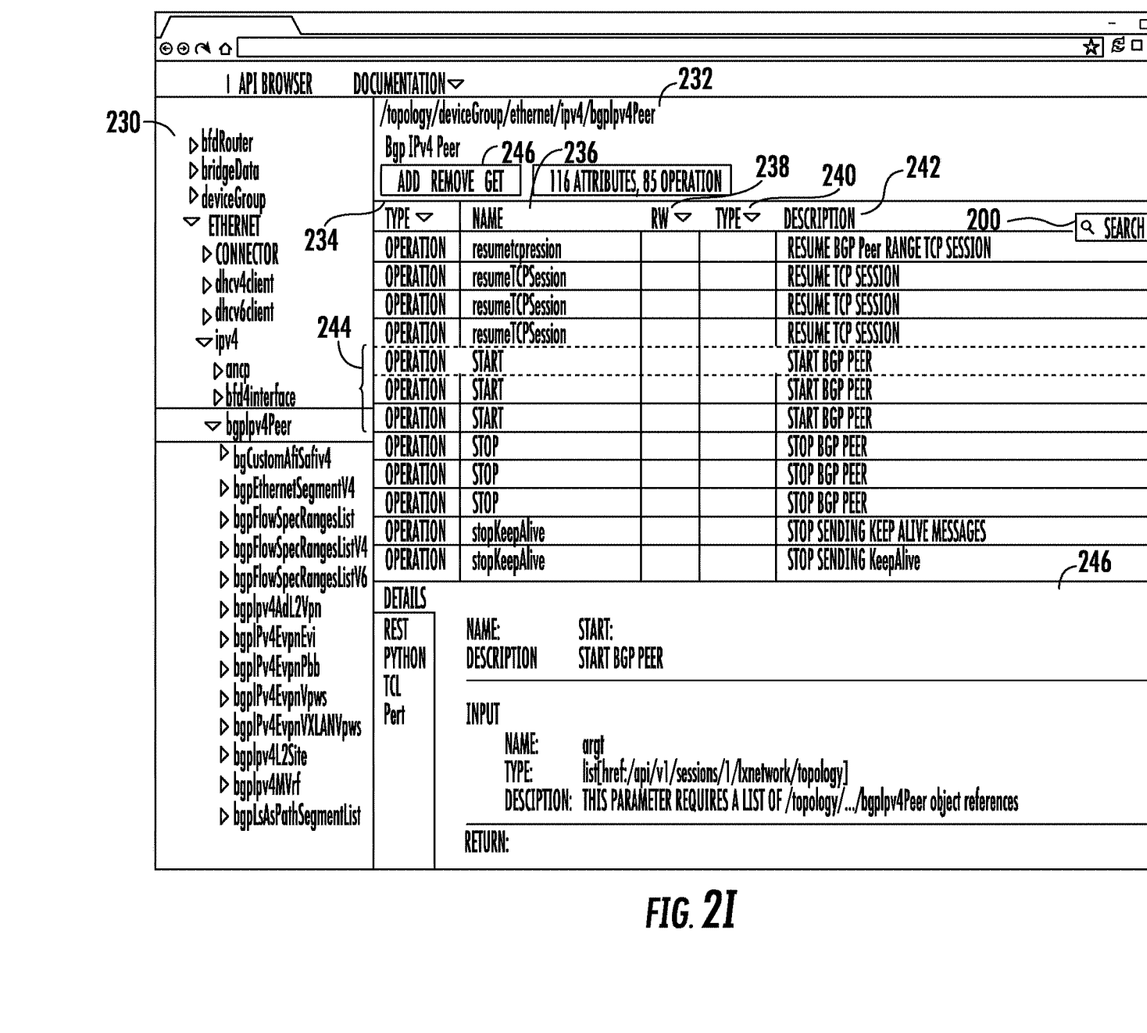

FIG. 2H illustrates selection of link 228 to access search results in hierarchical test objects API specification 108. FIG. 2I illustrates a documentation browser interface provided by API browser 110. In FIG. 2H, the documentation browser interface includes a hierarchy section 230 that displays locations in the hierarchy of object definitions proximal in the hierarchy to the object definition that matches the search criteria. In the illustrated example, bgpIPv4Peer is the location in the hierarchy of the object definition that matches the search criteria. The bgpIPv4Peer location is a level in the hierarchy that is itself within the ipv4 level. Without the search functionality provided by API browser 110 and search engine 112, the user would be required to manually search the levels of the hierarchy illustrated in FIG. 2I.

The documentation browser interface in FIG. 2I also includes a table section 232 showing attributes and operations that match the search criteria. In the illustrated example, table section 232 includes a type column 234, which specifies the type of each object definition. Table section 232 further includes a name column 236, which specifies the names of the located object definitions. Table section 232 further includes read/write column 238, which specifies whether an object definition corresponds to an object that is readable, writable, or both. Table section 232 further includes a type column 240, which indicates the restriction of the attribute or operation. The restriction can take the form of a simple datatype, a complex datatype or an operation signature. Table section 232 further includes a description column 242 which displays a description of each located object definition.

In the illustrated example, each of the located objects is of a type operation, which invokes a test function. In the middle of table section 232 are three operations 244 for starting BGP. Each operation invokes a different type of BGP start operation. For example, one operation may start BGP for an individual peer, another operation may start BGP for a range of BGP peers, and another operation may start BGP for a list of BGP peers.

The documentation API browser interface further includes a details section 246 that provides details for a selected operation. In the illustrated example, the user has selected the operation for starting BGP peer. Details section indicates that the object for starting the BGP peer takes as input a list of BGP level 4 peer object references.

Thus, using the interfaces illustrated in FIGS. 2F-2I, a user can locate object definitions in a hierarchy without knowing any of the details about the hierarchy. The user can also define instances of objects by selecting "get" via button 248 illustrated in FIG. 2I. When the user selects "get" via button 248, the currently selected operation will be used to define an instance of an object.

For example, in FIG. 2I, the user has selected the object definitions for starting a BGP peer. When the user selects "get", an instance of the start BGP peer object is defined. The user may be required to input parameters for attribute values for the start BGP peer object. The user can also select "add" or "remove" to add object definitions to or remove object definitions from table section 232.

Figure 3:
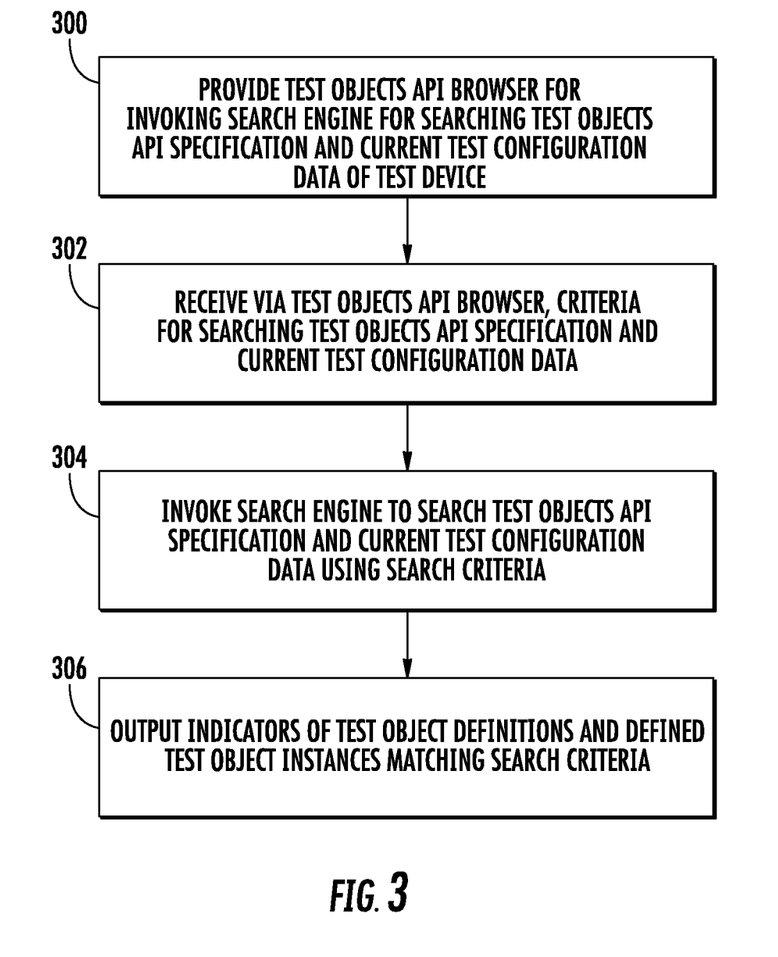
FIG. 3 is a flow chart illustrating an exemplary process for providing for searching of a hierarchical test objects API specification and current test configuration data using a test objects API browser and a test objects API search engine.

FIG. 3 is a flow chart illustrating an exemplary process for providing for searching of a hierarchical network equipment test device test objects API specification and current test configuration data of a network equipment test device. Referring to FIG. 3, in step 300, a test objects API browser for invoking a search engine for searching a test objects API specification and current test configuration data is provided. For example, test objects API browser 110 that allows a user to invoke test objects API search engine 112 may be provided. Browser 110 may be a graphical user interface that provides functionality described above with regard to FIGS. 2A-2I.

In step 302, the method includes receiving, via the test objects API browser, criteria for searching the test objects API specification and the current test configuration data. For example, test objects API browser may receive search criteria in search dialog box 200 for searching hierarchical test objects API specification 108, current test configuration data 109, or both.

In step 304, the method includes invoking the search engine to search the test objects API specification and the current test configuration data using the search criteria. For example, search engine 112 may be invoked to search hierarchical test objects API specification 108 and current test configuration data 109 using search criteria input by the user. Search engine 112 may search plural levels of the hierarchical test objects API specification 108 for object definitions matching the search criteria.

In step 306, the process includes outputting indications of the test object definitions and defined test object instances matching the search criteria. For example, test objects API browser 110 may return links or other indications of test object definitions and defined object instances that match search criteria. The links may be selectable so that when the user clicks on the links, the corresponding test object definition or defined object instance is displayed.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing for stress testing network devices for border gateway protocol (BGP) protocol compliance by searching a hierarchical network equipment test device test objects application programming interface (API) and a current test configuration data, the method comprising:
   providing a test objects API browser for invoking a search engine to search a hierarchical test objects API specification and the current test configuration data of a network equipment test device, wherein the hierarchical test objects API specification being located in the network equipment test device and including a plurality of levels, wherein at least some of which store definitions for test objects for accessing network equipment test device functions and the current test configuration data including defined instances of the test objects for invoking the network equipment test device functions, wherein the test objects API browser comprises a user interface for allowing a user to input textual search criteria for locating user-defined instances of test objects having names specified by the user or by another user, wherein the network equipment test device includes a traffic generator for generating and sending packet traffic to a device under test at line rates for stress testing the device under test and for testing the device under test for BGP protocol compliance by establishing transmission control protocol (TCP) connections with the device under test and for sending BGP network layer reachability update messages to the device under test over the connections, and wherein the test objects API specification includes definitions of objects for establishing the TCP connections, running the BGP protocol over the connections, and stress testing the device under test over the connections;
   receiving, via a dialog box of the test objects API browser and from the user, search criteria in text format and corresponding to all or part of name of a user-defined instance of a test object for searching the hierarchical test objects API specification and the current test configuration data without requiring the user to have knowledge of a structure of the hierarchical test objects API;
   searching, using the search engine, the plural levels of the hierarchical test objects API specification and the current test configuration data for objects and user-defined instances of test objects of the objects that match the search criteria; and
   outputting, to the user, the test object definitions and the user-defined instances of the test objects that match the search criteria, wherein outputting the user-defined instances of the test objects includes displaying, to the user and via the test objects API browser, selectable to links the user-defined instances of the test objects that match all or part of the name of the test object input by the user and outputting one of the user-defined instances of the test object to the user in response to receiving user selection of the corresponding link, wherein the outputting include a visual indication of a progress of the search and time since the start of the search and wherein the time is displayed in increments of one tenth of one second,
   and wherein the test object definition comprises a table including test object attributes and user-defined values for the attributes.

2. The method of claim 1 wherein providing a test objects API browser includes providing a graphical user interface with a search dialog box that allows selection of searching in the test objects API specification, the current test configuration data, or both.

3. The method of claim 1 wherein the search engine outputs to the user, object definitions and defined instances of objects and indicates whether the test object definitions and the defined instances of the test objects are found in the test configuration data or the test objects API specification.

4. The method of claim 1 wherein the test objects API browser displays an indication of a location in the current test configuration data in which a defined object instance matching the search criteria is stored.

5. The method of claim 1 wherein the search engine incrementally returns search results that match the search criteria prior to completion of the search.

6. The method of claim of claim 5 wherein the test objects API browser displays a progress indicator indicating progress of the search.

7. The method of claim 1 wherein the test objects API browser displays test object definitions matching the search criteria and an indication of a location in the hierarchical test objects API specification in which the test object definitions matching the search criteria are stored.

8. A system for providing for stress testing network devices for border gateway protocol (BGP) protocol compliance by searching a hierarchical network equipment test device test objects application programming interface (API) and a current test configuration data, the system comprising:
    at least one processor;
    a test objects API browser implemented by the at least one processor for providing a user interface for searching a hierarchical test objects API specification and the current test configuration data of a network equipment test device, wherein the hierarchical test objects API specification being located in the network equipment test device and including a plurality of levels, at least some of which store definitions for test objects for accessing network equipment test device functions and the current test configuration data including defined instances of the test objects for invoking the network equipment test device functions, and wherein the test objects API browser comprises a user interface for allowing a user to input textual search criteria for locating user defined instances of test objects having names specified by the user or by another user; and
    a test objects search engine implemented by the at least one processor for:
        receiving, via a dialog box of the test objects API browser, search criteria in text format and corresponding to all or part of a name of a user-defined instance of a test object for searching the hierarchical test objects API specification and the current test configuration data without requiring the user to have knowledge of a structure of the hierarchical test objects API,
        searching, using the search engine, the plural levels of the hierarchical test objects API specification and the current test configuration data for objects and defined instances of test objects of the objects that match the search criteria, and
        outputting, to the user, the test object definitions and the defined instances of the test objects that match the search criteria, wherein outputting the user-defined instances of the test objects includes displaying, to the user and via the test objects API browser, selectable to links the user-defined instances of the test objects that match all or part of the name of the test object input by the user and outputting one of the user-defined instances of the test object to the user in response to receiving user selection of the corresponding link, wherein the outputting include a visual indication of a progress of the search and time since the start of the search and wherein the time is displayed in increments of one tenth of one second, wherein the test object definition comprises a table including test object attributes and user-defined values for the attributes, wherein the network equipment test device includes a traffic generator for generating and sending packet traffic to a device under test at line rates for stress testing the device under test and for testing the device under test for BGP protocol compliance by establishing transmission control protocol (TCP) connections with the device under test and for sending BGP network layer reachability update messages to the device under test over the connections, and wherein the test objects API specification includes definitions of objects for establishing the TCP connections, running the BGP protocol over the connections, and stress testing the device under test over the connections.

9. The system of claim 8 wherein the test objects API browser includes a graphical user interface with a search dialog box that allows selection of searching in the test objects API specification, the current test configuration data, or both.

10. The system of claim 8 wherein the search engine outputs to the user, object definitions and defined instances of objects and indicates whether the test object definitions and the defined instances of the test objects are found in the test configuration data or the test objects API specification.

11. The system of claim 8 wherein the test objects API browser displays an indication of a location in the current test configuration data in which a defined object instance matching the search criteria is stored.

12. The system of claim 8 wherein the search engine incrementally returns search results that match the search criteria prior to completion of the search.

13. The system of claim of claim 12 wherein the test objects API browser displays a progress indicator indicating progress of the search.

14. The system of claim 8 wherein the test objects API browser displays test object definitions matching the search criteria and an indication of a location in the hierarchical test objects API specification in which the test object definitions matching the search criteria are stored.

15. A non-transitory computer readable medium having stored thereon executable instructions for stress testing network devices for border gateway protocol (BGP) protocol compliance and when executed by a processor of a computer control the computer to perform steps comprising:
    providing a test objects API browser for invoking a search engine to search a hierarchical test objects API specification and a current test configuration data of a network equipment test device, wherein the hierarchical test objects API specification being located in the network equipment test device and including a plurality of levels, at least some of which store definitions for test objects for accessing network equipment test device functions and the current test configuration data including defined instances of the test objects for invoking the network equipment test device functions, and wherein the test objects API browser comprises a user interface for allowing a user to input textual search criteria for locating user defined instances of test objects having names specified by the user or by another user;
    receiving, via a dialog box of the test objects API browser and from the user, search criteria in text format and corresponding to all or part of a name of a user-defined instance of a test object for searching the hierarchical test objects API specification and the current test configuration data without requiring the user to have knowledge of a structure of the hierarchical test objects API;
    searching, using the search engine, the plural levels of the hierarchical test objects API specification and the current test configuration data for objects and user-defined instances of test objects of the objects that match the search criteria; and outputting, to the user, the test object definitions and the user-defined instances of the test objects that match the search criteria, wherein outputting the user-defined instances of the test objects includes displaying, to the user and via the test objects API browser, selectable to links the user-defined instances of the test objects that match all or part of the name of the test object input by the user and outputting one of the user-defined instances of the test object to the user in response to receiving user selection of the corresponding link, wherein the outputting include a visual indication of a progress of the search and time since the start of the search and wherein the time is displayed in increments of one tenth of one second, wherein the test object definition comprises a table including test object attributes and user-defined values for the attributes, wherein the network equipment test device includes a traffic generator for generating and sending packet traffic to a device under test at line rates for stress testing the device under test and for testing the device under test for BGP protocol compliance by establishing transmission control protocol (TCP) connections with the device under test and for sending BGP network layer reachability update messages to the device under test over the connections, and wherein the test objects API specification includes definitions of objects for establishing the TCP connections, running the BGP protocol over the connections, and stress testing the device under test over the connections.

\* \* \* \* \*